July 10, 1945.                J. P. RATIGAN                 2,380,189
                              STUFFING BOX
                           Filed July 28, 1941            3 Sheets-Sheet 1
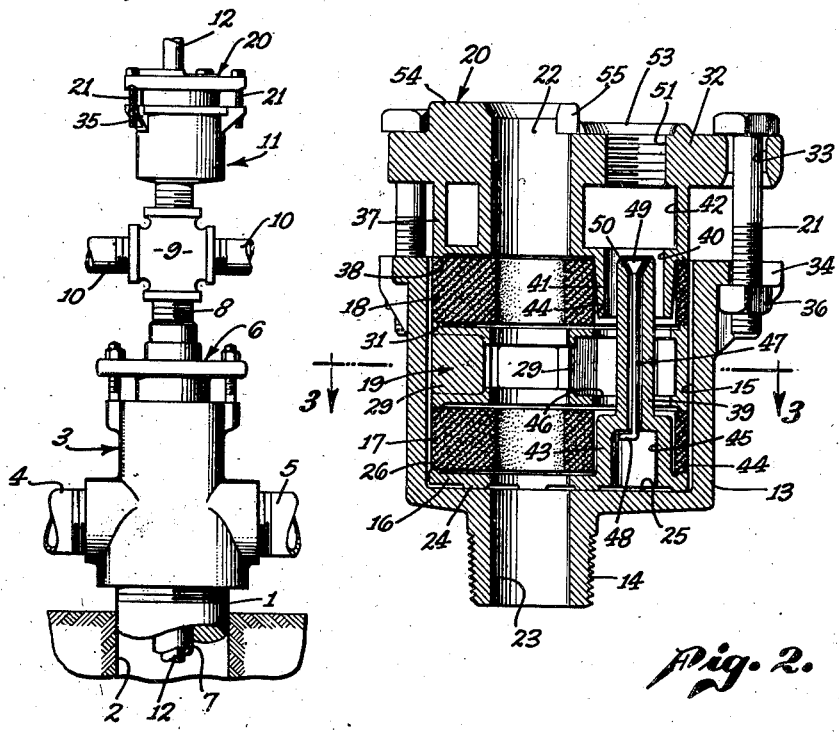
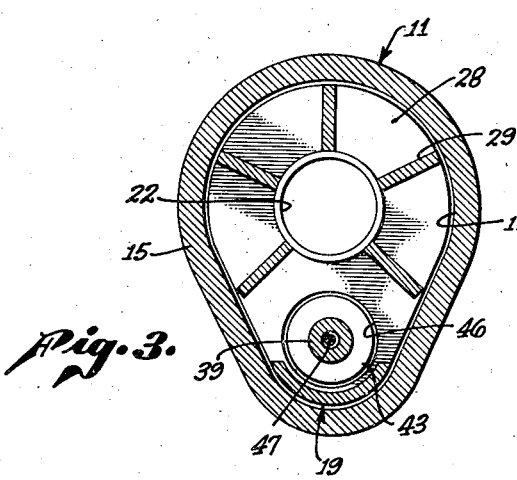
JAMES P. RATIGAN,
INVENTOR
BY Harold W. Mattingly
ATTORNEY.

July 10, 1945.　　　J. P. RATIGAN　　　2,380,189
STUFFING BOX
Filed July 28, 1941　　　3 Sheets-Sheet 2

JAMES P. RATIGAN,
INVENTOR

BY Harold W. Mattingly
ATTORNEY.

July 10, 1945.  J. P. RATIGAN  2,380,189
STUFFING BOX
Filed July 28, 1941    3 Sheets-Sheet 3
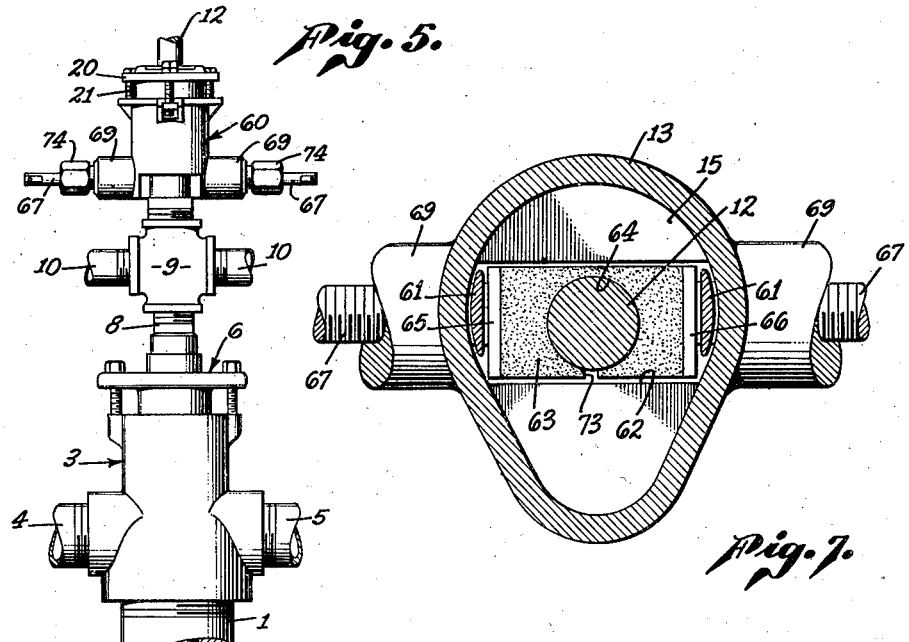
Fig. 5.
Fig. 7.
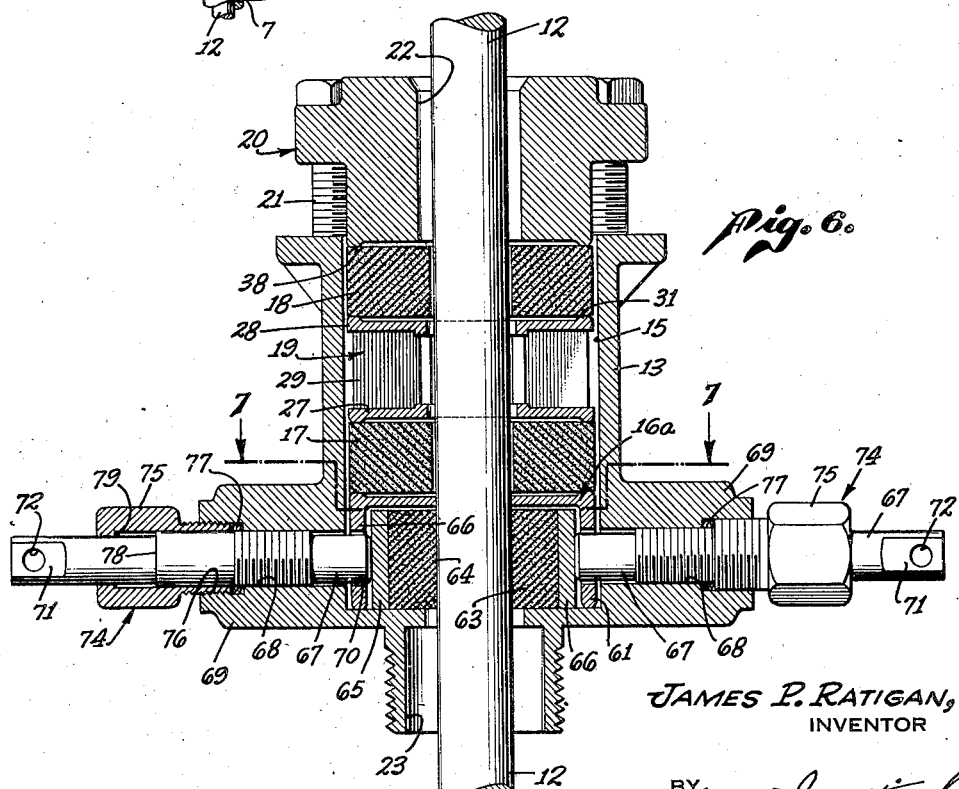
Fig. 6.
JAMES P. RATIGAN,
INVENTOR
BY Harold W. Mattingly
ATTORNEY.

Patented July 10, 1945

2,380,189

UNITED STATES PATENT OFFICE 2,380,189

STUFFING BOX

James P. Ratigan, Los Angeles, Calif.

Application July 28, 1941, Serial No. 404,259

8 Claims. (Cl. 286—27)

My invention relates to a stuffing box and has particular reference to an improved stuffing box or packing gland finding particular utility when employed to pack a reciprocating rod such as the polished rod of oil well pumping systems.

The primary function of a stuffing box is to provide a fluid seal between a conduit and a rotary or reciprocating rod which is positioned within the conduit. However, in stuffing boxes which are used in connection with oil well pumping systems, the stuffing box must, in addition to providing the required fluid seal, be so arranged as to accommodate a certain amount of axial and angular misalignment between the conduit and the reciprocating rod. Prior to my invention the stuffing box constructions employed to accomplish this result were complicated and employed a relatively large number of intricate and expensive parts.

Difficulty has been encountered in the prior devices resulting from a lack of adequate lubrication between the reciprocating rod and the packing material resulting in relatively rapid wear of either the rod or the packing material or both and necessitating frequent repairs. The prior stuffing box constructions were of such complicated construction that it was difficult for the ordinary unskilled mechanic employed at oil field pumping stations to make the necessary repairs and adjustments, frequently necessitating the removal of the stuffing boxes and the substitution therefor of a new or reconditioned stuffing box and the transmittal of the removed stuffing box to a central repair shop where it could be renewed by skilled mechanics.

Difficulty was also often encountered with the prior stuffing box constructions when an attempt was made to change or renew the packing material in the field, resulting from the tendency of certain wells to continue flowing a short time after the actual pumping operation was arrested. When this condition obtained, it was necessary to wait until the flowing of the well ceased before the stuffing box could be dismantled for the purpose of renewing the packing material. This occasioned a considerable loss of time and consequent increase in expense.

Occasionally in the pumping of oil wells the horse-head sling or some part thereof will break and allow the sucker rod string to fall until the polished rod clamp strikes the top of the stuffing box. The weight of the string of sucker rods (five thousand feet in length or longer) is enormous and when the horse-head sling breaks the string is allowed to drop from five to ten feet before the polished rod clamp strikes the stuffing box. With the conventional constructions a mishap of this character invariably results in destruction of the stuffing box due primarily to the fact that the present stuffing box constructions are rigid throughout and there is no cushioning available to take up the force of the blow which is struck by the polished rod clamp.

It is, therefore, an object of my invention to provide a stuffing box which includes packing means providing a fluid seal between a conduit and a rod reciprocal in the conduit and which includes also means for maintaining a supply of lubricant between the rod and the packing.

It is also an object of my invention to provide a stuffing box of the character set forth in the preceding paragraph which includes a plurality of packing elements spaced from each other and a means for introducing and continually replenishing a supply of lubricant between the spaced packing elements.

It is an additional object of my invention to provide a stuffing box construction of the character set forth in the preceding paragraph which includes a means for maintaining a supply of lubricant in the stuffing box during such time as the oil well pumping system may be shut down or otherwise rendered inoperative.

It is also an object of my invention to provide a stuffing box of the character set forth hereinbefore in which the uppermost part of the stuffing box is resiliently supported upon the body portion of the stuffing box to cushion the effects of any blows that may be struck on such uppermost portion to thereby prevent breaking of the stuffing box.

It is a still further object of my invention to provide a stuffing box of the character set forth in the preceding paragraphs wherein the packing elements are of large size and formed of flexible material permitting the reciprocating rod to be moved to various positions out of alignment with the axis of the conduit without destroying the fluid seal between the rod and the conduit.

It is additionally an object of my invention to provide a stuffing box of the character set forth in the preceding paragraphs wherein the parts thereof may be assembled only in one fashion, thus positively preventing improper assembly of the device by unskilled mechanics.

It is also an object of my invention to provide a stuffing box of the character set forth hereinbefore which includes a shut off means disposed below the packing elements and arranged to permit the establishment of a fluid seal between the rod and the conduit independently of the packing elements.

Other objects and advantages of my invention will be apparent from a study of the following specifications, read in connection with the accompanying drawings, wherein:

Fig. 1 is an elevational view illustrating the general form and appearance of the preferred embodiment of my invention and the manner in which it may be used in an oil well pumping system;

Fig. 2 is a longitudinal vertical section of the stuffing box illustrated in Fig. 1;

Fig. 3 is a cross sectional view taken substantially along the line III—III of Fig. 2;

Fig. 5 is an elevational view similar to Fig. 1 but illustrating the form, appearance and manner of use of a modified form of stuffing box construction;

Fig. 6 is a vertical sectional view of the stuffing box illustrated in Fig. 5; and Fig. 7 is a cross sectional view taken substantially along the line VII—VII of Fig. 6.

Figure 4:
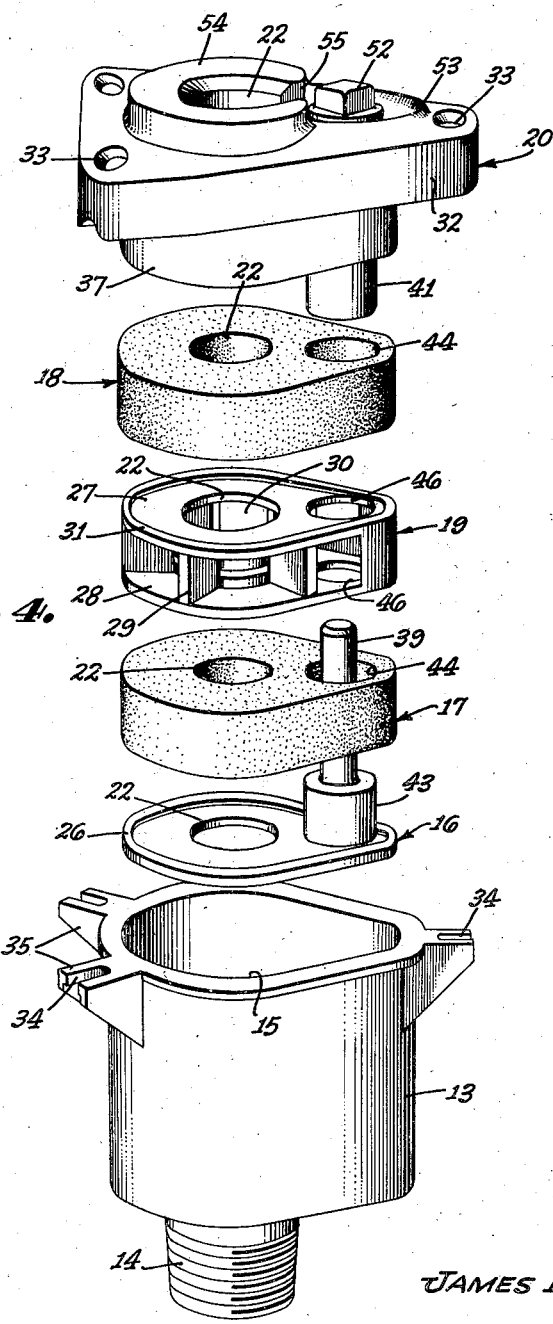
Fig. 4 is an exploded perspective view of the stuffing box illustrating the relative positioning of the parts and the manner in which the device is assembled.

Referring to the drawings, I have illustrated in Fig. 1 the casing head portion of a typical oil well pumping system as including a casing 1 which is normally fitted into at least the upper portion of the oil well bore 2. Upon the upper end of the casing 1 there is fitted a casing head 3 which includes means for effecting a connection to gas lead lines 4 and 5. The casing head 3 also includes a packing and support assembly indicated generally in Fig. 1 by the reference character 6 which is employed to seal off the annular space between the casing 1 and a string of flow tubing 7 which is extended downwardly through the casing to the location of the pump deep within the well.

The flow tubing 7 is extended upwardly through the casing head 3 as indicated at 8 and is fitted with a cross 9 providing connections to liquid or oil lead lines 10. The cross 9 is adapted to support a stuffing box 11 through which a polished rod 12 forming the uppermost part of the sucker rod string is extended. The sucker rod string which is connected to the lower end of the polished rod provides the driving connection between the power apparatus located at the ground surface and the reciprocating pump plunger disposed deep within the well bore.

According to the preferred embodiment of my invention the stuffing box 11 is preferably constructed along the lines illustrated in Figs. 2, 3 and 4 and includes a body portion 13 which may have a downwardly extending nipple or boss 14 formed integrally therewith and threaded either externally or internally to permit attachment to the cross 9. The body 13 defines a stuffing box chamber 15 which is preferably formed of a non-circular shape for reasons which will be made apparent hereinafter, the form which is illustrated in Figs. 2 through 4 comprising an oval or egg shape.

Within the chamber 15 I position a lower spacing element 16 and a pair of packing elements 17 and 18 between which is positioned a lantern gland 19. An upper gland member 20 is adjustably secured to the body 13 as by means of bolts or other suitable attaching means 21 to permit a longitudinal compressive force of considerable magnitude to be exerted upon the packing elements 17 and 18.

All of the elements thus far described are provided with centrally disposed bores 22 disposed in axial alignment with a bore 23 formed in the lower nipple portion 14 to receive the polished rod 12. Each of the elements 16—20 are contoured to conform to the shape of the chamber 15 so as to permit their being positioned therein. Attention is directed to the fact that by so shaping the chamber 15 and the elements 16—20, it is impossible to assemble the device if the elements are turned to improper or misaligned positions.

The lower spacing member 16 is preferably formed as a substantially flat plate which is provided on its under surface with a plurality of ribs or projections 24 adapted to engage the bottom 25 of the chamber 15 and space the plate therefrom. As is best shown in Fig. 4, the upper surface of the member 16 is provided near its peripheral edge with a slightly raised rim 26 adapted to engage the under surface of the packing element 17 to provide a high pressure ring-like contact area to establish an effective fluid seal between the element 16 and the packing member 17 when a longitudinal compressive force is exerted on the packing member 17.

The lantern gland 19 preferably comprises a pair of plate-like members 27 and 28 supported in fixed axially spaced relation to each other by means of a plurality of vertically extending webs or fins 29 between which are defined radial openings 30 affording a communication between the polished rod which passes through the central aperture 22 and the interior of the chamber 15. The plate members 27 and 28 are provided on their upper and lower surfaces, respectively, with a peripherally extending ridge 31 corresponding in construction and function to the raised rim 26 previously referred to.

The upper gland member 20 comprises a cover plate portion 32 which is provided with a plurality of openings 33 for receiving the bolts 21. These bolts are adapted, when the device is assembled in the manner illustrated in Fig. 2, to be received in radially disposed slots 34 provided in outwardly extending ears 35 formed on the body 13. Nuts 36 threadedly engaging the bolts 21 are positioned below the ears 35, whereby tightening the bolts 21 operates to urge the upper gland member 20 downwardly with respect to the body 13. A downwardly projecting boss member 37 is formed integrally with the cap portion 32 and the boss member 37 is shaped so as to be closely received within the chamber 15. As is shown in Fig. 2, the under surface of the boss member 37 is likewise provided with a peripherally disposed and downwardly extending shoulder 38 to provide a ring-like area of high pressure contact between the upper gland member and the upper packing element 18.

It will be noted that the upper and lower surfaces of each of the packing elements 17 and 18 is securely clamped between ring-like shoulders formed on the elements 16, 19 and 37 so that an adequate fluid seal is provided between the packing elements 17 and 18 and the members 16, 19 and 37.

The bore 22 which is provided through the packing elements 17 and 18 is preferably of a size to closely receive the polished rod 12, and the packing elements 17 and 18 are preferably formed of rubber, "neoprene" or other highly flexible and resilient but non-compressible material. Thus, as a longitudinal compressive force is exerted on the packing elements 17 and 18, these members are thereby expanded radially to provide a firm pressure engagement between the walls of the bores 22 therethrough and the outer surface of the polished rod so as to provide an adequate fluid seal between the polished rod and the packing elements.

Similarly, the radial expansion of the members 17 and 18 brings their outer surfaces into firm pressure engagement with the walls of the chamber 15 so as to provide an adequate fluid seal between the packing elements and the body 13. Thus, the packing elements 17 and 18 serve to provide a complete and adequate seal between the fluid passage 23 through which the polished rod 12 is extended and the body 13 of the packing gland so as to positively prevent fluid confined under pressure within the passage 23 from escaping.

The lantern gland 19 is employed for the purpose of permitting adequate lubrication of the polished rod to prevent wear of the polished rod and the bores 22 in the packing elements 17 and 18 as the polished rod 12 is reciprocated. In accordance with the preferred embodiment of my invention I provide a means for maintaining and constantly replenishing a supply of oil in the spaces and openings 30 defined by the lantern gland 19. This means preferably includes a standpipe 39 which is extended upwardly from the lower spacing element 16 a distance sufficient to be received within a bore 40 provided in a downwardly extending cylindrical boss 41 formed integrally with the boss portion 37 of the upper packing gland 20. The bore 40 communicates with a cored out chamber 42 formed in the boss 37 and serving as an oil reservoir.

The standpipe 39 is preferably provided with a larger diameter portion 43 near its junction with the spacing element 16 and the packing elements 17 and 18 are each provided with a bore 44 of such size and disposed in such location as to receive the enlarged standpipe portion 43 and the cylindrical boss portion 41, respectively. The standpipe 39 is provided with a fluid passage 45 communicating with the space provided between the spacing element 16 and the bottom 25 of the chamber 15 by the ribs and projections 24. Thus, oil confined under pressure in the fluid passage or conduit 23 may flow through the space between the element 16 and the bottom 25 of the stuffing box chamber and thence upwardly through the fluid passage 45 in the standpipe 39.

Upon flowing out of the top of the standpipe 39 the oil may flow downwardly around the outside of the same and into the openings and spaces 30 defined by the lantern gland 19, the plate members 27 and 28 of the lantern gland 19 being provided with relatively large diameter openings 46 for receiving the standpipe 39. Oil thus supplied to the spaces within the lantern gland 19 serves to lubricate the packing elements 17 and 18 and the polished rod 12 as the polished rod is reciprocated, and excess oil supplied through the standpipe 39 flows into the reservoir space 42 and fills the same so as to maintain a supply of lubricant during such time as the pumping equipment may be shut down.

Such a supply may be held in the reservoir 42 by providing a check valve in the standpipe 39. A simple check valve construction is illustrated in Fig. 2 as comprising a rod 47 which is slidably received within the passage 45 provided in the standpipe 39. The lower end of the rod 47 is preferably bent over as indicated at 48 to limit the upward movement of the rod, and the upper end of the rod 47 is provided with a valve head 49 adapted to be lowered into sealing relationship with a valve seat 50 formed on the upper end of the standpipe. This check valve construction operates to permit fluid to be pumped into the reservoir space 42 and to prevent fluid from flowing from the reservoir 42 downwardly through the standpipe 39 during such time as the oil well pump is not operating.

In order that the polished rod 12 may be adequately lubricated when the stuffing box is first placed in use, I provide a filler opening 51 which is extended through the upper plate portion 32 of the gland member 20 and into communication with the chamber 42. The chamber 42 may thus be filled and after filling the opening 51 may be closed as by means of a threaded pipe plug 52 shown in Fig. 4.

If it is desired to provide lubrication of the polished rod above the upper gland member 18 the same may be accomplished by merely loosening the plug 52 sufficiently to permit a small amount of oil to leak through the opening 51. This oil will be confined to the immediate vicinity of the plug 52 by means of a dike or ridge 53 which is formed on the upper surface of the gland member 20. A similar dike or ridge 54 is provided about the opening 22 through which the polished rod 12 passes and the laterally disposed slot 55 in the ridges 53 and 54 provides a communication through which oil leaking past the plug 52 is conveyed to the opening 22 in the upper gland member 20.

The openings 22 in the upper gland member 20, in the lantern gland 19, and in the spacing member 16 are all made somewhat larger than the diameter of the polished rod so that there is provided a considerable amount of clearance between the polished rod and these members. Thus, if the polished rod is forced to a position misaligned from the axis of the conduit 23, it is not necessarily brought into metal to metal engagement with the members 16, 19 or 20. Furthermore, such misalignment of the polished rod is permitted by the flexible and resilient character of the packing elements 17 and 18, these elements serving to maintain the desired fluid seal even though the polished rod is so axially misaligned.

I have illustrated in Figs. 5, 6 and 7 a modified form of stuffing box construction, such modified form being indicated generally by reference character 60 in Fig. 5. The stuffing box 60 is similar in construction to the stuffing box previously described but includes additionally a shut off means which permits a fluid seal to be established between the polished rod 12 and the body of the stuffing box at a point below the packing elements 17 and 18, thus permitting the stuffing box to be disassembled for the purpose of replacing or renewing the packing elements 17 and 18 even though the well is of the character which tends to flow for a considerable length of time after pumping operations are stopped.

In accordance with this form of the invention the stuffing box body 13 defines a stuffing box chamber 15 within which an upper gland member 20, an upper packing element 18, a lantern gland 19, a lower packing element 17 and a lower spacing member 16a are positioned in precisely the same manner as has been previously described in connection with Figs. 1 through 4.

The lower spacing member 16a is identical with the spacing element 16 previously described with the exception that it includes a pair of downwardly extending ears 61 which are received within a rectangular box-like recess 62 formed in the lower portion of the stuffing box body 13. The box or recess 62 is employed to house a shut off member 63 which is formed as a rectangular plug of rubber, "Neoprene" or other highly flexible and resilient but non-compressible material having an opening 64 formed therein in a position to receive the sucker rod 12. The end faces of the plug 63 are secured as by means of a suitable adhesive to steel pressure plates 65 and 66 disposed in positions to be engaged by the inner ends of a pair of clamping screws 67.

The screws 67 are threaded into suitably threaded openings 68 provided in laterally extending boss portions 69 formed integrally with the stuffing box body 13, and the innermost ends of the screws 67 are passed through suitable apertures 70 provided in the ears 61, whereby the screws 67 serve to hold the lower spacing element 16a down and prevent it being lifted upwardly through the stuffing box chamber 15 until the screws 67 are unscrewed a distance sufficient to remove them from the aperture 70.

Upon rotation of the screws 67 in a direction to force the pressure plates 65 and 66 toward each other, the resilient shut off member 63 is compressed axially with respect to the axis of the screws 67 and is thereby expanded in the remaining directions to exert an inwardly directed pressure upon the polished rod 12, a laterally directed pressure against the side walls of the recess 62 and a vertically directed pressure against the under surface of the spacing member 16a and the bottom surface of the recess 62. Thus, the conduit 23 is sealed off between the body 13 and the polished rod 12 permitting the upper gland member 20 to be removed and the sealing members 17 and 18 to be removed and replaced even though fluid may be confined within the conduit 23 under a considerable pressure.

Attention is directed to the fact that the lower spacing member 16a is prevented from being raised as a result of the upwardly directed pressure exerted thereon by the expansion of the shut off member 63 since the spacing member 16a is held down by the screws 67 which are passed through the aperture 70 in the lug 61.

The shut off member 63 is preferably split at one or both sides as indicated at 73 in Fig. 7 so that when the screws 67 are backed off there will be provided an oil passage from the conduit 23 into the space immediately below the lower spacing member 16a so that in normal operation the device can perform its self-oiling function as has been previously described. During normal operation leakage of oil around the screws 67 may be prevented by employing packing member 74 which may comprise a tubular nut 75 threadedly received within a counterbore 76 and adapted to exert pressure on a suitable sealing member 77 interposed between the counterbore 76 and the screws 67.

Preferably the screw 67 is shouldered as at 78, the outer portion upon which the wrench flats 71 are formed being of a smaller diameter than the portion which is threadedly engaged with the boss 69. By providing an oppositely directed shoulder 79 on the interior of the tubular nut 75, a positive limit is provided as to the amount of retractive movement to which the screws 67 may be subjected. This prevents the inadvertent removal of these screws and a consequent loss of oil through the openings in which the screws are received.

From the foregoing it will be observed that I have provided a novel stuffing box construction which includes a means for continually oiling the sliding engagement between the sealing members and the polished rod and which also includes a means for maintaining an adequate supply of lubricant at this point at all times while the rods are in motion regardless of whether the pump is maintaining a full head of oil immediately below the stuffing box.

Attention is also directed to the fact that by forming the stuffing box chamber 15 as an egg shape or other non-circular form, proper assembly of the device is insured since it is impossible to turn the various members which are received within the chamber to any angular position other than the correct position.

It will also be noted that by providing the shut off arrangement as is illustrated in Figs. 5 through 7, I have provided a means whereby the sealing members of the stuffing box may be renewed at any time even though the well is of the character which tends to flow for an appreciable time after pumping operations are stopped.

While I have shown and described the preferred embodiment of my invention, I do not desire to be limited to any of the details of construction shown or described herein, except as defined in the appended claims.

I claim:

1. In a stuffing box for providing a fluid seal between a vertically disposed reciprocating rod and a conduit surrounding said rod and confining therein oil under pressure, the combination of: a body member secured to the upper end of said conduit and defining a stuffing box chamber through which said rod is extended; a pair of sealing members in said chamber surrounding said rod for providing a fluid seal between said rod and said body; means spacing said sealing members axially of each other; means for conducting oil from said conduit to the space between said sealing members; and passage means around the uppermost one of said sealing members for conducting oil from said space to the surface of said rod at a point above said uppermost one of said sealing members.

2. In a stuffing box for providing a fluid seal between a vertically disposed reciprocating rod and a conduit surrounding said rod and confining therein oil under pressure, the combination of: a body member secured to the upper end of said conduit and defining a stuffing box chamber through which said rod is extended; a pair of sealing members in said chamber surrounding said rod for providing a fluid seal between said rod and said body; means spacing said sealing members axially of each other; means for conducting oil from said conduit to the space between said sealing members; passage means around the uppermost one of said sealing members for conducting oil from said space to the surface of said rod at a point above said uppermost one of said sealing members; and means in said passage means for controlling the rate of flow of oil therethrough.

3. In a stuffing box for providing a fluid seal between a reciprocating rod and a conduit surrounding said rod and confining therein oil under pressure, the combination of: a stuffing box body secured to said conduit defining a stuffing box chamber communicating with a recess disposed adjacent said conduit; a cover plate in said chamber extending across said recess; a lug on said cover extending into said recess, said lug having an aperture therethrough; removable sealing means in said chamber above said cover plate establishing a fluid seal between said body and said rod; a block of flexible and resilient but non-compressible material in said recess surrounding said rod; screw means threadedly engaged with said body and extending through said aperture to secure said cover plate in said chamber, said screw means being so positioned as to dispose the inner end thereof adjacent said block for exerting a compressive force on said block in one direction to thereby expand said block in other directions into sealing engagement between the walls of said recess and said cover plate and said rod, whereby said sealing means may be removed without allowing oil to escape from said conduit.

4. In a stuffing box for providing a fluid seal between a reciprocating rod and a conduit surrounding said rod and confining therein oil under pressure, the combination of: a body member secured to said conduit and defining a stuffing box chamber of asymmetrical oval cross section through which said rod is extended; a removable sealing member in said chamber having an opening through which said rod is extended and providing a fluid seal between said rod and said body, said sealing member being shaped to conform to the cross section of said chamber and having a hole formed therein spaced from and extending parallel to said opening; and means in said chamber extending through said hole for conducting oil from said conduit to that part of said chamber disposed on the opposite side of said sealing member from said conduit, said sealing member being also reversible as to which side thereof is uppermost, whereby said opening and said hole are properly positioned whenever said sealing member is placed in said chamber.

5. In a stuffing box for providing a fluid seal between a vertically disposed reciprocating rod and a conduit surrounding said rod and confining therein oil under pressure, the combination of: a body member secured to the upper end of said conduit and defining a stuffing box chamber of asymmetrical oval cross section through which said rod is extended; a pair of sealing members in said chamber, each having an opening through which said rod is extended for providing a fluid seal between said rod and said body; spacing means spacing said sealing members axially of each other, said spacing means having an opening for passing said rod, said spacing means and said sealing members each being reversible as to which side is uppermost and each being shaped to conform to the cross section of said chamber, said spacing means and said sealing members each also having formed therein a hole spaced from said opening and extending parallel to said opening; and means in said chamber extending through said holes for conducting oil from said conduit to that part of said chamber disposed on the opposite side of said sealing members from said conduit, whereby said openings and said holes are properly positioned and aligned whenever said sealing members and said spacing member are placed in said chamber.

6. In a stuffing box for providing a fluid seal between a reciprocating rod and a conduit surrounding said rod and confining therein oil under pressure, the combination of: a body member secured to said conduit and defining a stuffing box chamber through which said rod is extended; a sealing member in said chamber surrounding said rod and providing a fluid seal between said rod and said body; means defining a passage extending through said sealing member for conducting oil from said conduit to that part of said chamber disposed on the opposite side of said sealing member from said conduit; plate means interposed between said sealing member and the bottom of said chamber; and means on said plate means defining a fluid interconnection between said conduit and said passage.

7. In a stuffing box for providing a fluid seal between a vertically disposed reciprocating rod and a conduit surrounding said rod and confining therein oil under pressure, the combination of: a body member secured to the upper end of said conduit and defining a stuffing box chamber through which said rod is extended; a pair of sealing members in said chamber, each having an opening through which said rod is extended for providing a fluid seal between said rod and said body; means spacing said sealing members axially of each other, said spacing means having an opening for passing said rod, said spacing means and said sealing members each also having formed therein a hole spaced from said opening and extended parallel to said opening; plate means interposed between the lower one of said sealing members and the bottom of said chamber; means on said plate means extending upwardly through said holes and defining a passage for conducting oil from said conduit to that part of said chamber disposed on the opposite side of said sealing members from said conduit; and means on said plate means defining a fluid interconnection between said conduit and said passage.

8. In a stuffing box for providing a fluid seal between a reciprocating rod and a conduit surrounding said rod and confining therein oil under pressure, the combination of: a body member secured to said conduit and defining a stuffing box chamber through which said rod is extended; a sealing member in said chamber surrounding said rod and having its outer peripheral wall fully contacting the inner peripheral wall of said chamber, said sealing member providing a fluid seal between said rod and said body; and passage means wholly within said chamber and including a portion extending through said sealing member for conducting oil to that part of said chamber disposed on the opposite side of said sealing member from said conduit.

JAMES P. RATIGAN.